(12) United States Patent
Whitty

(10) Patent No.: US 6,848,227 B2
(45) Date of Patent: Feb. 1, 2005

(54) INTUMESCENT FLOOR OPENING FRAME

(75) Inventor: Larry Whitty, Woodbridge (CA)

(73) Assignee: Royal Group Technologies Limited, Woodbridge (CA)

( * ) Notice: Subject to any disclaimer, the term of this patent is extended or adjusted under 35 U.S.C. 154(b) by 13 days.

(21) Appl. No.: 10/260,551

(22) Filed: Oct. 1, 2002

(65) Prior Publication Data

US 2004/0016191 A1 Jan. 29, 2004

(51) Int. Cl.$^7$ ............................. H02G 3/22; F16L 5/04
(52) U.S. Cl. ............................. 52/232; 52/220.8; 52/1; 174/48; 227/615
(58) Field of Search ................................ 52/232, 220.8, 52/1; 174/48; 277/615

(56) References Cited

U.S. PATENT DOCUMENTS

| | | | | |
|---|---|---|---|---|
| 4,189,619 A | * | 2/1980 | Pedlow | 174/48 |
| 4,221,092 A | * | 9/1980 | Johnson | 52/232 |
| 4,245,445 A | * | 1/1981 | Heinen | 52/220.8 |
| 4,249,353 A | * | 2/1981 | Berry | 52/232 |
| 4,419,535 A | * | 12/1983 | O'Hara | 174/48 |
| 4,493,173 A | * | 1/1985 | Kohaut | 52/220.8 |
| 4,669,759 A | * | 6/1987 | Harbeke | 285/136.1 |
| 4,758,003 A | * | 7/1988 | Goldstein et al. | 277/314 |
| 4,848,043 A | * | 7/1989 | Harbeke | 52/1 |
| 4,894,966 A | * | 1/1990 | Bailey et al. | 52/317 |
| 4,901,488 A | * | 2/1990 | Murota et al. | 52/232 |
| 5,257,641 A | * | 11/1993 | Elsbury et al. | 137/79 |
| 5,347,767 A | * | 9/1994 | Roth | 52/1 |
| 5,887,396 A | * | 3/1999 | Thoreson | 52/232 |
| 6,305,133 B1 | * | 10/2001 | Cornwall | 52/232 |
| 6,536,169 B2 | * | 3/2003 | Dykhoff | 52/220.8 |

FOREIGN PATENT DOCUMENTS

| | | | | |
|---|---|---|---|---|
| CA | 2394592 A1 | * | 1/2004 | F16L/5/04 |
| EP | 0146193 A1 | * | 6/1985 | F16L/5/02 |
| GB | 2203900 A | * | 10/1988 | H02G/3/22 |
| GB | 2222916 A | * | 3/1990 | F16L/5/02 |
| GB | 2233725 A | * | 1/1991 | F16L/5/00 |
| WO | 91/19540 | * | 12/1991 | F16L/5/02 |

* cited by examiner

Primary Examiner—Robert Canfield

(57) ABSTRACT

A frame for bordering conduit access through a building floor has a rigid body portion and a lining of intumescent material on an interior surface of the rigid body portion. The intumescent material has sufficient expansion capacity to close off the opening through the frame under conditions which produce an intumescing of the lining. The rigid body portion itself is preferably made of a metallic material to enhance transfer of heat energy from the rigid body portion to the lining of the frame.

6 Claims, 3 Drawing Sheets

INTUMESCENT FLOOR OPENING FRAME

FIELD OF THE INVENTION

The present invention relates to a frame member and a framing assembly with fire stop capacity useable at a conduit access opening through a building separation.

BACKGROUND OF THE INVENTION

Conduit openings are required in a building separation to allow different types of conduits to pass from one room to another within a building. By way of example, the floor of a building will include an opening through which cables, telephone wires and pipes etc. are fitted into the building. These conduit openings must be provided with means to seal them off in the event of a fire and smoke situation. Otherwise the openings form open flow channels for the fire and smoke to pass from level to level through a building.

It is known in the industry to provide fire and smoke blocking means at a conduit access through a building separation. However, the known methods of providing such blockage do not adapt themselves particularly well to adding further conduit through the access.

For example, it is known to fit cable and telephone wire through a blocking member at a conduit access. Specific openings are provided in the blocking member to accommodate each cable or wire passing through the opening. These openings are dimensioned at substantially the same diameter as the cable and wire passing through the opening. Accordingly, the only way to later fit further cable and wire through the access is by removing the blocking member to provide further openings for the cable and wire to be added. This is a time consuming job and results in a potentially hazardous situation during the time that the blocking member needs to be removed from the access to add the new openings.

SUMMARY OF THE PRESENT INVENTION

The present invention provides a frame for bordering a conduit access through a building separation which is extremely easy to set up and which does not suffer from the reconfiguration problems associated with prior art conduit access fire and smoking blocking arrangements. More particularly, the frame of the present invention comprises a rigid body portion with a conduit fitting opening through the rigid body portion. A lining of intumescent material is provided on an interior surface of the rigid body portion. The intumescent material has sufficient expansion capacity to close off the conduit fitting opening under conditions which produce an intumescing of the lining. In addition, the rigid body portion is preferably made from a metallic material to enhance transfer of heat energy from the rigid body portion to the lining to produce a fast reaction of the intumescent material of the frame.

BRIEF DESCRIPTION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION IN WHICH

Figure 1:
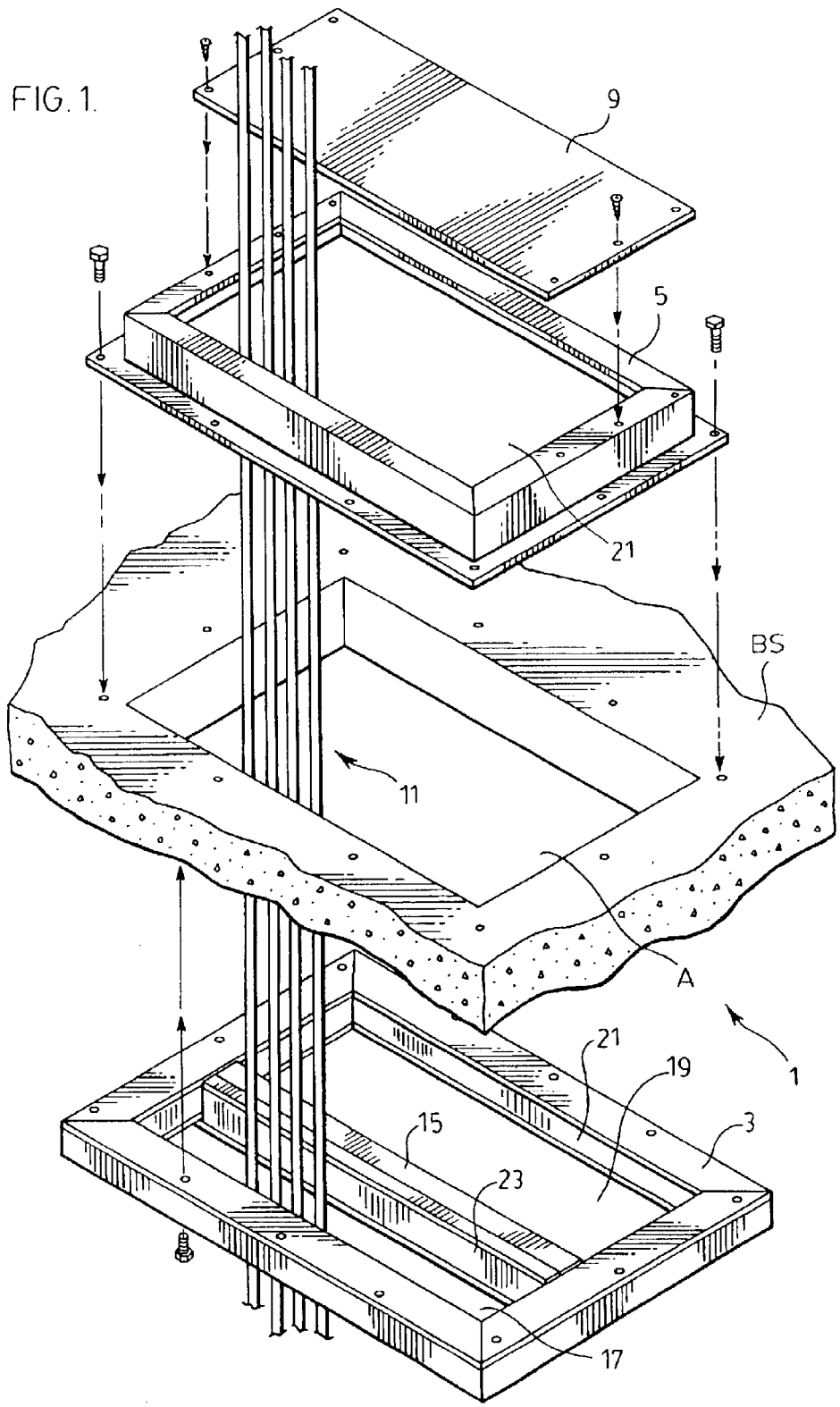
FIG. 1 is an exploded perspective view of a conduit access framing system according to a preferred embodiment of the present invention.

FIG. 1 shows a framing assembly for framing an access opening A through a building separation BS. In this particular case, the building separation comprises a floor of a building through which a bundle of wires generally indicated at 11 are passed into the building. These wires will be cable lines and telephone wires etc. In other situations the access opening can be used for fitting other types of conduit such as ducts and pipes through the building separations.

Framing assembly 1 comprises a pair of actual frame members 3 and 5 which are used to border access A from below and above the access opening. The upper frame member 5 defines a singular rectangular opening 21 through the frame member.

The lower frame member 3 includes a frame spanning member 15 which divides the open area through frame member 3 into a first opening 17 and a second opening 19. As shown in FIG. 1 the bundle of wires 11 pass upwardly through the first opening 17 in the lower frame member 3.

Figure 2:
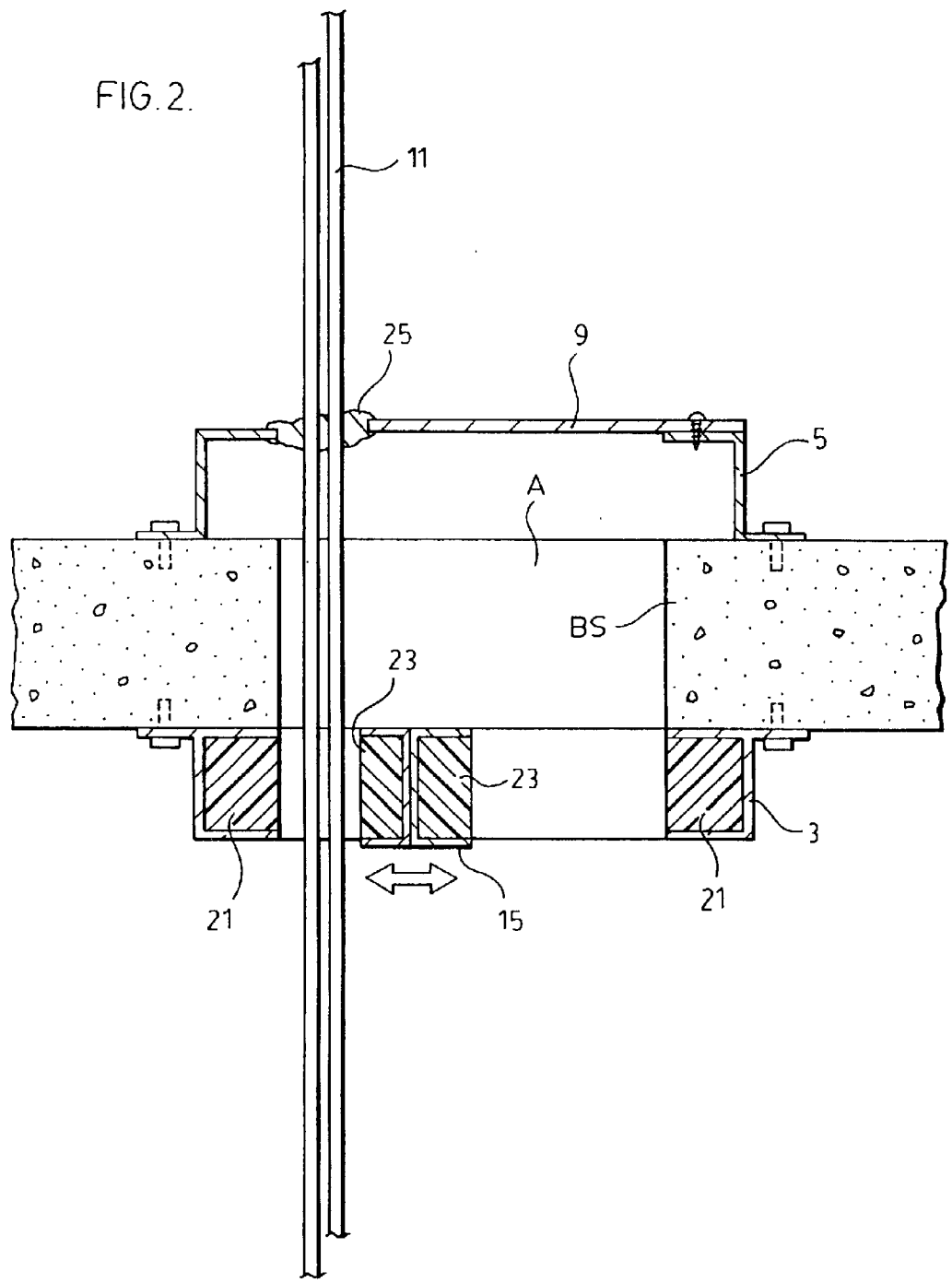
FIG. 2 is a sectional view through the framing system of FIG. 1 in an assembled condition.

The two frame members 3 and 5 are mechanically secured to the under surface and the top surface respectively of the building separation as shown for example in FIG. 2 of the drawings. In addition, a covering plate 9 secures atop the upper frame member 5 covering most of the opening 21 through the upper frame member. The only part of opening 21 which is not covered is the area where the wires 11 pass through the upper frame member.

Each of the frame members 3 and 5 has a rigid construction with both frame members preferably being made of a heavy gauge metal. Cover plate 9 also preferably has a metallic construction thereby ensuring the integrity of the assembled system.

FIG. 2 of the drawings shows a number of further features of the system of FIG. 1. More particularly, FIG. 2 shows that the lower frame member 3 is provided with a lining 21 of intumescent material. This lining is provided on the interior surfaces of at least the two longer sides of frame member 3 and is preferably provided on the interior surfaces of all four sides of the lower frame member.

Frame spanning member 15 which again preferably has a metallic construction is also provided with opposite side linings 23 of intumescent material. Accordingly, each of the openings 17 and 19 is exposed to the intumescent material from opposite sides of each of the openings.

The actual intumescent material used to provide the two linings 21 and 23 is preferably a plastic based extruded material which is bonded to the frame member. By way of example only, the intumescent material may be extruded graphite in a polyvinyl chloride carrier. Such material when subjected to heat indicative of a fire situation intumesces or expands as shown in FIG. 3 to many times the size of its non-intumesced condition as shown in FIG. 2.

Another feature shown in FIG. 2 is that the individual wires 11 are packed together with one another by putty material 25 which may also be intumescent material. This material helps to keep the wires in their bundled configuration and also acts as a fire and smoke seal where the bundles pass through the non-covered opening in the upper frame 5.

Figure 3:
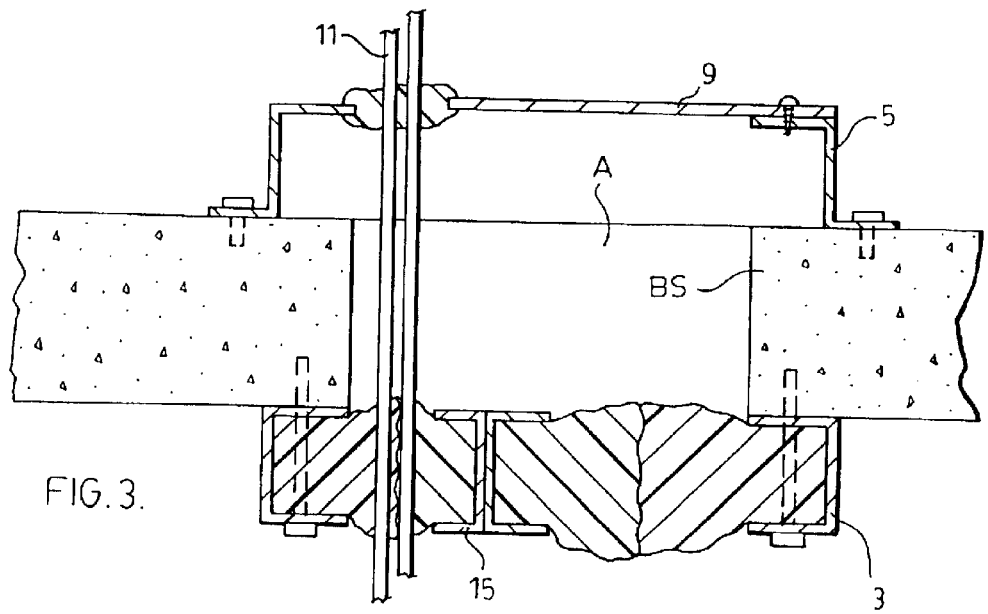
FIG. 3 is a view similar to FIG. 2 following an intumescing of the intumescent material within the system.

As earlier noted FIG. 3 of the drawings shows the frame assembly in an intumesced condition. In this condition, the intumescent linings of the lower frame member 3 and the frame spanning member 15 have expanded sufficiently to completely close off both of the openings 17 and 19 through the lower frame member. In addition, the putty 25 around the wires 11 completely seals off the opening not covered by plate 9 through the top frame 5.

The rest of the open through the upper frame member to the side of the wire bundle may also be closed off by silicone packing or the like. Here it should be noted that the preferred metallic construction of the different frame members and components provides a very rapid heat transfer for a fast reaction of the intumescent material for sealing off the entire assembly when subject to fire indicating heat conditions. Accordingly, fire and smoke is prevented from passing through the access opening upon activation of the intumescent material.

One of the key features of the present invention resides in the feature that no particular pattern of holes needs to be provided in either the lower or upper frame member to receive the cables and wires 11 or any other type of conduit. For example, as will be seen in FIG. 1 opening 17 through the lower frame member and the opening left through the upper frame member after placing the top cover on the upper frame member are both substantially oversized relative to the number of wires passing through the two frame members. Accordingly, it is only a matter of simply shoving additional cables and wires upwardly through the frame assembly without having to reconfigure it whatsoever. The only thing that needs to be added to receive the additional wires and cables is more putty around the newly added wires and cables. However, this does not require any disassembly whatsoever of the system.

The use of the putty between the wires not only holds the wires in a pre-set desired position but also ensures that any possible gaps between the wires are sealed off by the putty.

Figure 4:
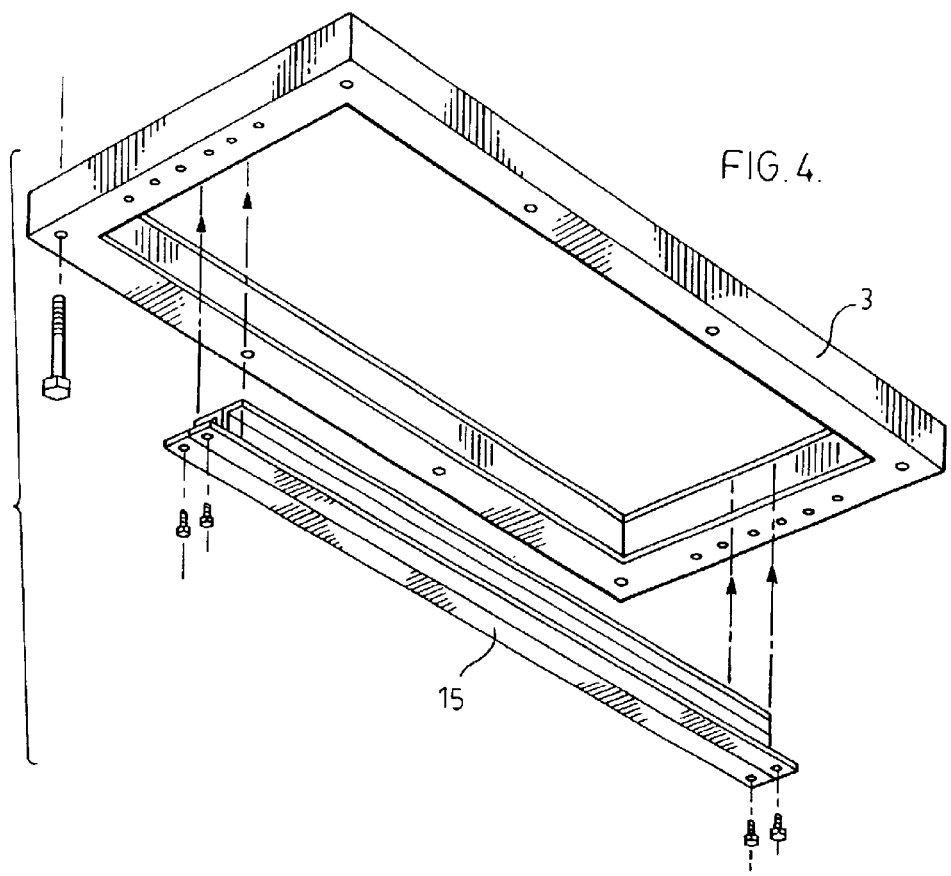
FIG. 4 is an exploded perspective view of the bottom framing element of the system of FIG. 1.

Another feature of the present invention is that both the frame spanning member 15 and the top cover 9 are moveable in position relative to the lower and upper frame members respectively. This becomes important in the event that opening 17 through the lower frame member 3 and the aligned opening around cover 9 on the top frame member become overly crowded and not capable of accepting any further conduit. This situation is dealt with by simply repositioning spanning member 15 on the lower frame member 3 using anyone of the different sets of mounting holes in the lower frame member as shown in FIG. 4 of the drawings. By doing this the size of opening 17 can be increased while decreasing the size of opening 19. In addition, the upper frame member 5 is also provided with different sets of mounting holes to allow a repositioning of cover 9 on the upper frame member as shown in FIG. 1 of the drawings. Once again, the reconfiguration of the system to accept more wires is done without having to remove either frame member from its mounted position around the access opening A. Therefore, if a fire situation were to occur while setting the system up to receive more wires and cables the lower frame member with its intumescent lining 21 would still be capable of immediately reacting to the situation by intumescing to close off all of the open area through the lower frame member.

Although various preferred embodiments of the present invention have been described in detail, it will be appreciated by those skilled in the art that variations may be made without departing from the spirit of the invention or the scope of the appended claims.

The embodiments of the invention in which an exclusive property or privilege is claimed are defined as follows:

1. A framing assembly comprising first and second frame members for bordering top and bottom sides of a conduit opening through a building floor, each of said frame members comprising a rigid body portion with a conduit passage therethrough, said assembly further including a rigid cover securable atop said first frame ember to one side of the conduit passage through the first frame ember, said second frame member being provided with a lining of intumescent material around the conduit passage through said second frame member, the intumescent material having sufficient expansion capacity to close off the conduit passage through the second frame member under conditions which produce an intumescing of the lining.

2. A framing assembly as claimed in claim 1 in which the rigid body portion of the second frame member is made of a metallic material to enhance transfer of heat energy therefrom to said lining of said second frame member.

3. A framing assembly a claimed in claim 1 wherein said second frame member includes a frame panning member extending across said second frame member, said frame spanning member defining one side of the conduit passage through said second frame member and also defining one side of a second opening through said second frame member, said lining of intumescent material being provided to both sides of said frame spanning member and also interiorly on said second frame member around said second opening through said second frame member such that said conduit passage and said second opening through said second frame member are bordered by the intumescent material, the intumescent material having sufficient expansion capacity to close off both said conduit passage and said second opening under conditions which produce an intumescing of said intumescent material.

4. A frame as claimed in claim 3 wherein said frame spanning member is moveable to adjust size of said conduit passage and said second opening through said second frame member.

5. A frame as claimed in claim 3 wherein said lining of intumescent material comprises a plastic based extruded material bonded to said second frame member.

6. A frame as claimed in claim 5 wherein said intumescent material comprises graphite in a polyvinyl chloride carrier.

* * * * *